United States Patent
Jones et al.

(10) Patent No.: US 7,629,042 B2
(45) Date of Patent: Dec. 8, 2009

(54) MULTILAYER MICROPOROUS FILMS AND METHODS

(75) Inventors: Gregory K. Jones, Lebanon, OH (US); Larry Hughey McAmish, Cincinnati, OH (US); Pai-Chuan Wu, Cincinnati, OH (US); Kenneth L. Lilly, Lebanon, OH (US); Christopher Aaron Shelley, Cincinnati, OH (US); Mark Andrew Wendorf, Mason, OH (US)

(73) Assignee: Clopay Plastic Products Company, Inc., Mason, OH (US)

( * ) Notice: Subject to any disclaimer, the term of this patent is extended or adjusted under 35 U.S.C. 154(b) by 0 days.

(21) Appl. No.: 10/217,880

(22) Filed: Aug. 13, 2002

(65) Prior Publication Data

US 2003/0035943 A1 Feb. 20, 2003

Related U.S. Application Data

(60) Provisional application No. 60/312,006, filed on Aug. 13, 2001.

(51) Int. Cl.
*B32B 3/26* (2006.01)
*B32B 5/32* (2006.01)

(52) U.S. Cl. .............. 428/316.6; 428/317.9; 428/319.3; 428/319.7; 428/319.9; 442/370; 442/372; 442/374

(58) Field of Classification Search .............. 428/315.5, 428/316.6, 317.9, 319.3, 319.7, 319.9; 442/370, 442/372, 374
See application file for complete search history.

(56) References Cited

U.S. PATENT DOCUMENTS

| | | | |
|---|---|---|---|
| 3,870,593 A | 3/1975 | Elton et al. | |
| 4,824,568 A | 4/1989 | Allegrezza, Jr. et al. | |
| 4,863,792 A * | 9/1989 | Mrozinski | 428/315.5 |
| 4,968,464 A * | 11/1990 | Kojoh et al. | 264/41 |
| 5,196,247 A | 3/1993 | Wu et al. | |

(Continued)

FOREIGN PATENT DOCUMENTS

FR 2 802 849 A1 6/2001

(Continued)

OTHER PUBLICATIONS

The article "Calcium Carbonate for microporous breathable films Market and product requirements", 10 pages, 2001.*

*Primary Examiner*—Hai Vo
(74) *Attorney, Agent, or Firm*—Dinsmore & Shohl LLP

(57) ABSTRACT

Multilayer microporous films comprise first and second microporous film layers. The first film layer has a first maximum pore size and the second film layer has a second maximum pore size different from the first maximum pore size. In a more specific embodiment, the multilayer microporous films comprise coextruded first, second and third microporous film layers. One of the first, second and third film layers has a maximum pore size smaller than the respective maximum pore sizes of the remaining layers of the multilayer film or larger than the respective maximum pore sizes of the remaining layers of the multilayer film, and the one layer does not have an unconstrained surface in the multilayer film. Methods for producing multilayer microporous films provide a first film layer having a maximum pore size upon stretching which is different from that of a second film layer upon stretching.

25 Claims, 3 Drawing Sheets

U.S. PATENT DOCUMENTS

| | | | |
|---|---|---|---|
| 5,202,173 A | 4/1993 | Wu et al. | |
| 5,254,111 A | 10/1993 | Cancio et al. | |
| 5,382,461 A | 1/1995 | Wu | |
| 5,407,979 A | 4/1995 | Wu et al. | |
| 5,422,172 A | 6/1995 | Wu | |
| 5,531,899 A | 7/1996 | Yen et al. | |
| 5,536,413 A * | 7/1996 | Bormann et al. | 210/650 |
| 5,592,690 A | 1/1997 | Wu | |
| 5,690,949 A | 11/1997 | Weimer et al. | |
| 5,830,603 A | 11/1998 | Oka et al. | |
| 5,851,937 A | 12/1998 | Wu et al. | |
| 5,865,926 A | 2/1999 | Wu et al. | |
| 5,955,187 A * | 9/1999 | McCormack et al. | 428/315.5 |
| 6,013,151 A | 1/2000 | Wu et al. | |
| 6,045,900 A * | 4/2000 | Haffner et al. | 428/315.9 |
| 6,090,441 A | 7/2000 | Vining, Jr. et al. | |
| 6,114,024 A * | 9/2000 | Forte | 428/315.9 |
| 6,235,377 B1 | 5/2001 | Dillon et al. | |
| 6,261,674 B1 | 7/2001 | Branham et al. | |
| 6,264,044 B1 * | 7/2001 | Meyering et al. | 210/490 |
| 6,534,150 B1 * | 3/2003 | Yamanaka et al. | 428/143 |
| 6,540,949 B2 * | 4/2003 | Pip et al. | 264/172.19 |
| 2003/0005999 A1 | 1/2003 | Wu et al. | |

FOREIGN PATENT DOCUMENTS

| | | |
|---|---|---|
| FR | 2802849 | 6/2001 |
| JP | 2001162741 | 6/2001 |
| WO | WO 99/60050 | 11/1999 |
| WO | WO 9959813 A1 * | 11/1999 |
| WO | 0115898 A1 | 3/2001 |

* cited by examiner

MULTILAYER MICROPOROUS FILMS AND METHODS

RELATED APPLICATION

This application claims priority under 35 U.S.C. § 119 of U.S. Provisional Application Ser. No. 60/312,006, filed Aug. 13, 2001.

FIELD OF THE INVENTION

The present invention relates to microporous films, and, more particularly, the present invention relates to multilayer microporous films comprising at least two microporous film layers, and to methods for producing multilayer microporous films. The film layers of the multilayer films according to the invention may be provided with controlled pore sizes to customize or optimize various properties of the multilayer films.

BACKGROUND OF THE INVENTION

Various materials and processes have been described for use in the production of microporous films. For example, the Elton et al U.S. Pat. No. 3,870,593, incorporated herein by reference, describes a process wherein a microporous film is produced by dispersing finely divided particles of a non-hygroscopic inorganic salt such as calcium carbonate into a suitable polymer, e.g., by milling, forming a film of the filled polymer, and stretching the film to provide good porosity and water absorptive or transmissive characteristics. Microporous films are well known for use in various applications, typically where air and moisture permeabilities are desired together with liquid barrier properties.

Various technologies have attempted to improve the performance of microporous films and composite materials in which such films are employed by controlling the film pore size. For example, the Allegrezza, Jr. et al U.S. Pat. No. 4,824,568 discloses the formation of a microporous ultrafiltration membrane by precipitating a polymer from a solution of the polymer in a suitable solvent. Pore size is controlled through processing techniques and temperature. However, the materials employed in the disclosed techniques are costly and the processes of solvent extraction and drying require very low throughput. In addition, the membranes are prepared on the surface of a previously manufactured microporous support layer, and such a multistep process is inefficient.

Attempts to control pore formation in microporous films have also employed additives to film compositions. For example, the Yen et al U.S. Pat. No. 5,531,899 describes pore size control in microporous ion exchange films via the use of a porogen, an additional agent that is mixed into a polymer and subsequently removed to create pores. The solvent processing steps required to remove the porogen are expensive and inefficient. The Weimer et al U.S. Pat. No. 5,690,949 discloses a microporous film composition having viral barrier properties. Weimer et al disclose the use of a fluorinated compound to increase the wetting resistance of the microporous film and provide the barrier properties. The fluorinated compound is a costly additive and does not control the actual film pore size.

The Oka et al U.S. Pat. No. 5,830,603 discloses a porous battery separator film that may have varied porosity or pore sizes through the film thickness. The disclosed films comprise a fluororesin matrix made porous by a relatively complicated process of biaxially stretching and annealing a sintered, solvent-extracted paste extrusion of a fluoropolymer powder/liquid lubricant system, followed by hydrophilization of at least a portion of the film. The films typically have a porosity of at least 70% and pore sizes of up to 50 microns, much larger than is useful for applications where a liquid barrier is required, such as in disposable healthcare and hygienic products.

The Branham et al U.S. Pat. No. 6,261,674 discloses a breathable microlayer polymer film having 8 to 17,000 microlayers. The layers are alternately formed of first and second polymers, some of which may be rendered microporous. The first polymer is disclosed as more breathable than the second polymer. Branham et al disclose the use of non-standard extrusion equipment such as cutting and spreading layer multiplying die elements to form their films.

Many of the conventional processes for controlling pore size in microporous films involve the use of expensive additives and/or employ cumbersome processing techniques which are not suitable for large scale production. Accordingly, there is a continuing need for providing improvements in the performance of microporous polymer films and composite materials employing such films, for example by customizing or optimizing multiple properties of the microporous films, particularly while maintaining high production efficiency of such films using standard extrusion equipment and readily available raw materials.

SUMMARY OF THE INVENTION

Accordingly, it is an object of the present invention to provide improved microporous films, and particularly to provide microporous films in which desirable combinations of properties may be obtained. It is a related object of the invention to provide methods for producing such microporous films.

These and additional objects are provided by the present invention. In one embodiment, the invention is directed to a multilayer microporous film comprising first and second microporous film layers. The first film layer has a first maximum pore size and the second film layer has a second maximum pore size different from the first maximum pore size. In a more specific embodiment, the invention is directed to a multilayer microporous film comprising first, second and third microporous film layers. One of the first, second and third film layers has a maximum pore size smaller than the respective maximum pore sizes of the remaining layers of the multilayer film or larger than the respective maximum pore sizes of the remaining layers of the multilayer film, and the one layer does not have an unconstrained surface in the multilayer film. In a further embodiment, the invention is directed to a multilayer microporous film comprising at least two microporous film layers, wherein the two film layers have different maximum pore sizes and wherein one of the film layers is arranged so as to not have an unconstrained surface in the multilayer film.

In yet a further embodiment, the invention is directed to methods for producing a multilayer microporous film. A first method comprises coextruding at least first and second film layers and stretching the film layers to render them microporous, wherein the first film layer has at least one component which differs from that of the second film layer, which component is adapted to cause the first film layer to have a maximum pore size upon stretching which is different from that of the second film layer upon stretching.

A second method comprises extruding at least first and second film layers, stretching the film layers to render them microporous, wherein the first film layer has a maximum pore size upon stretching which is different from that of the second film layer upon stretching, and laminating the layers together.

In a third method, a first film layer is formed, for example by extrusion, a second film layer is then extrusion coated on the first film layer, and the resulting multilayer film is stretched. The first film layer may optionally be stretched before the second film layer is extrusion coated thereon. The first film layer has a maximum pore size upon stretching which is different from that of the second film layer upon stretching.

The multilayer microporous films and methods according to the invention allow one to control the maximum pore size of the multilayer films while customizing or optimizing multiple properties of the microporous films and composites in which such films are included. Additionally, these improvements may be obtained by methods employing standard extrusion equipment and readily available raw materials.

These and additional objects and advantages will be more fully apparent in view of the detailed description which illustrates various modes contemplated for carrying out the invention. As will be realized, the invention is capable of other different obvious aspects without departing from the invention. Accordingly, the drawings and specification are illustrative in nature and not restrictive.

BRIEF DESCRIPTION OF THE DRAWINGS

While the specification concludes with claims particularly pointing out and distinctly claiming the present invention, it is believed that the invention will be further understood from the following detailed description taken in conjunction with the accompanying drawings in which:

DETAILED DESCRIPTION

Within the context of the present specification, the term "microporous film layer" is intended to refer to a polymer film layer which comprises one or more filler materials and is stretched after film formation to provide the microporosity therein. "Microporous" is used herein to refer to a porous material in which the pores are not readily visible to the naked eye, and typically have a maximum pore size not greater than about several microns. In specific embodiments, the pores are sufficiently small so that the multilayer microporous films are liquid impervious at atmospheric pressure. Additionally, within the context of the present specification, the term "multilayer microporous film" refers to films comprising two or more microporous film layers. The present invention is directed to multilayer microporous films and methods for producing multilayer microporous films. The maximum pore sizes of the respective microporous film layers included in the multilayer microporous films are controlled in order to customize or optimize the overall properties of the multilayer microporous films.

In a first embodiment, the multilayer microporous film comprises first and second microporous film layers, wherein the first film layer has a first maximum pore size and the second film layer has a second maximum pore size different from the first maximum pore size. A schematic diagram of a multilayer microporous film according to this embodiment is set forth in FIG. 1. More specifically, the multilayer microporous film 10 comprises a first microporous film layer 12 adjacent to a second microporous film layer 14. As will be discussed in further detail below, the microporous film layers are joined with one another at an interface 16, for example by coextrusion of the film layers, by extrusion coating, or by other lamination technique subsequent to film formation. While the schematic diagrams show the film interfaces as a clearly defined line, one of ordinary skill in the art will recognize that the actual film interface between film layers does not typically comprise a clear line demarcation. Additionally, in the schematic diagrams, differences in pore size between the film layers are represented by grids of varying sizes. The grids provide no representation of the actual pore size, configuration or count, or of the composition of any individual layer.

Figure 2:
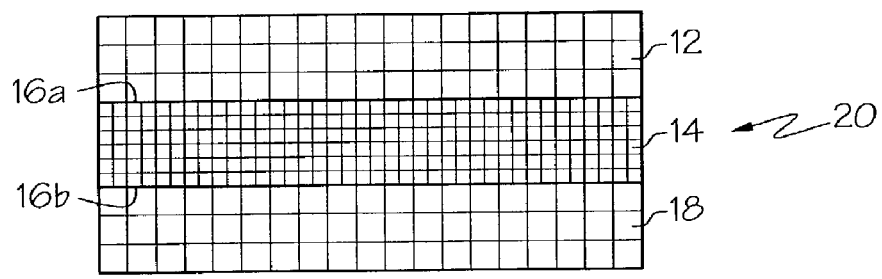
FIG. 2 is a schematic diagram of a multilayer microporous film according to the present invention comprising three microporous film layers.

In a more specific embodiment, the multilayer microporous films according to the invention may comprise a third microporous film layer having a third maximum pore size. This embodiment is illustrated schematically in FIG. 2 wherein a multilayer microporous film 20 comprises first, second and third microporous film layers 12, 14 and 18, respectively. The film layers 12 and 14 are adjacent to each other at interface 16a while the films 14 and 18 are adjacent one another at the interface 16b. In the embodiment of FIG. 2, the second film layer 14 is schematically disclosed as having a smaller maximum pore size relative to the first and third film layers 12 and 18, respectively. However, the multilayer films according to the invention may comprise any arrangement of the layers of relative maximum pore size, whereby the film layer or layers having the largest maximum pore size may be arranged as an outer surface film layer or layers or as an inner film layer wherein both surfaces of the film layer are constrained by adjacent film layers or other layers of a composite product. Similarly, the film layer or layers having the smallest maximum pore size may be arranged as an outer surface film layer or layers or as an inner film layer wherein both surfaces of the film layer are constrained by adjacent film layers or other layers of a composite product. In a more specific embodiment, the microporous film layer having the smallest maximum pore size is positioned between the first and third film layers, as shown by the second film layer 14 positioned between the first film layer 12 and the third film layer 18 in FIG. 2. In another more specific embodiment, the microporous film layer with the largest maximum pore size is positioned between film layers having relatively smaller maximum pore sizes. The maximum pore sizes of the outermost layers may be the same, substantially the same, or different from one another.

Figure 1:
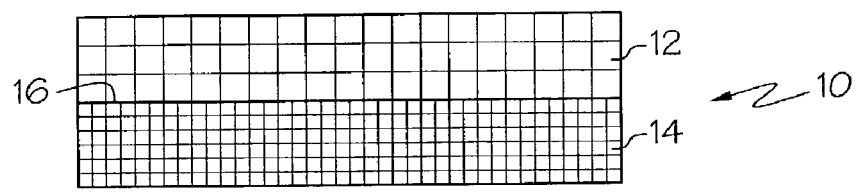
FIG. 1 is a schematic diagram of a multilayer microporous film according to the present invention comprising two microporous film layers.

One skilled in the art will appreciate that the multilayer microporous films according to the present invention may comprise two microporous film layers as shown in FIG. 1, three microporous film layers as shown in FIG. 2, four microporous film layers, or five or more microporous film layers. In many embodiments, less than eight microporous film layers are contemplated.

Importantly, by varying the maximum pore size between the microporous film layers of the multilayer microporous film, it is possible to control the maximum pore size of the multilayer film together with additional properties of the multilayer film to provide customized or optimized combinations of properties. It has surprisingly been discovered that a combination of microporous film layers having different maximum pore sizes will provide a multilayer microporous film which exhibits a maximum pore size substantially characteristic of the one or more layers of the multilayer film which are arranged so as to have no free, unconstrained surfaces. That is, the multilayer microporous films typically exhibit a maximum pore size characteristic of film layers which do not have an exposed surface in the multilayer film or in a composite product in which the multilayer film is employed. For example, with reference to FIG. 2, the multilayer microporous film 20 will exhibit a maximum pore size characteristic of the inner second film layer 14 arranged between the outer first and third film layers 12 and 18, respectively, regardless of whether the film layer 14 has the largest maximum pore size of the three layers or the smallest maximum pore size of the three layers. The surfaces of the film layer 14 are constrained at interface 16*a* by the first film layer 12 and at 16*b* by the third film layer 18.

Figure 3:
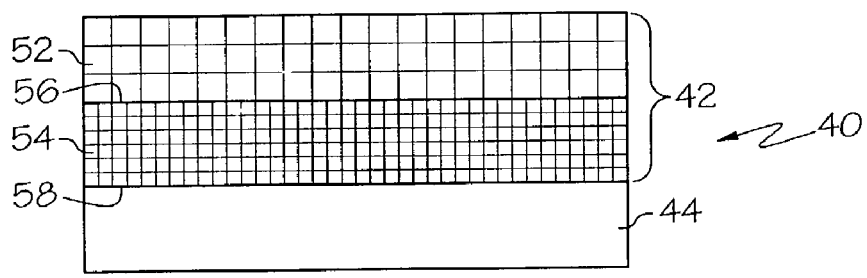
FIG. 3 is a schematic diagram of a multilayer microporous film according to the present invention comprising two microporous film layers and a nonwoven web layer.

Similarly, with reference to FIG. 1, when the multilayer film 10 is formed as a composite material, with one of microporous film layers 12 and 14 arranged adjacent another layer of the composite, and the other of microporous film layers 12 and 14 exposed as an outer surface, the one of layers 12 and 14 which is constrained at both surfaces will characterize the maximum pore size of the multilayer microporous film as employed in the composite. More particularly, with reference to FIG. 3, a multilayer microporous film composite material 40 comprises a multilayer microporous film 42 in combination with a nonwoven layer 44. The multilayer microporous film 42 comprises a first microporous film layer 52 having a first maximum pore size and a second microporous film layer 54 having a second maximum pore size different from the first maximum pore size. The layers 52 and 54 are adjacent one another at interface 56. Thus, one surface of the second microporous film layer 54 is adjacent the first microporous film layer 52 at interface 56 while the other surface of the microporous film layer 54 is constrained at interface 58 by the nonwoven layer 44 of the composite material. As a result, the multilayer microporous film 42 will exhibit a maximum pore size more characteristic of the constrained film layer 54, regardless of whether the film layer 54 has a larger or smaller maximum pore size as compared with the microporous film layer 52.

Figure 4:
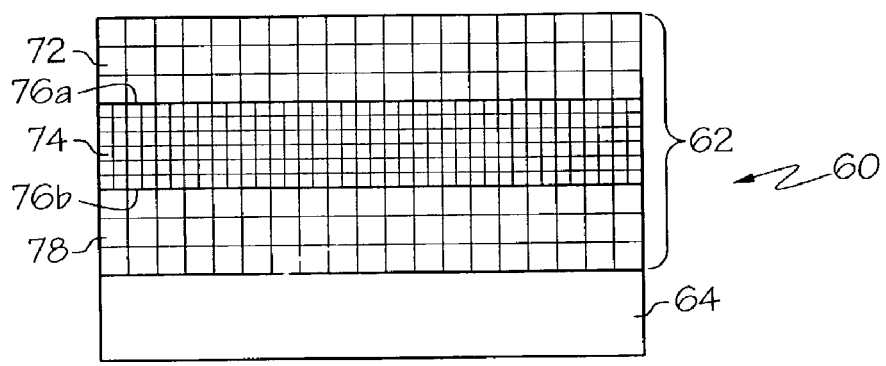
FIG. 4 is a schematic diagram of a multilayer microporous film according to the present invention comprising three microporous film layers and a nonwoven web layer.

The multilayer microporous films according to the present invention may comprise additional layers to form composite materials as described, for example, in FIG. 4. FIG. 4 sets forth an additional embodiment of a multilayer microporous film composite containing a non-microporous film layer. More specifically, with reference to FIG. 4, the multilayer microporous film composite material 60 comprises a multilayer microporous film 62 and a nonwoven layer 64. The multilayer microporous film 62 comprises first, second and third microporous film layers 72, 74 and 78, respectively, wherein layers 72 and 74 are joined at interface 76*a* and layers 74 and 78 are joined at interface 76*b*. Although not shown in the figures, the nonwoven layer may be arranged between two of the film layers, if desired. Additional multilayer microporous films including non-microporous layers to form composites will be apparent to those of ordinary skill in the art and are included within the scope of the invention.

In the three layer embodiments of the microporous film layers shown in FIGS. 2 and 4, the first and third film layers, 12 and 18 in FIG. 2 and 72 and 78 in FIG. 4, are arranged as outer layers and are schematically indicated as having similar maximum pore sizes different from that of the second, inner film layer 14 and 74, respectively. In accordance with the three film layer embodiment of the multilayer microporous films according to the invention, the first, second and third maximum pore sizes of the first, second and third layers may be of any relative maximum pore size with respect to one another, as long as at least two of the layers have differing maximum pore sizes. Thus, the first and third layers as shown in FIGS. 2 and 4 may have maximum pore sizes which are the same, substantially the same, or different from one another. Additionally, the film layer or layers with the largest or smallest maximum pore size may be provided in any layer order as desired in order to obtain a desired multilayer microporous film maximum pore size.

The microporous film layers of the multilayer films according to the present invention may be provided with differing pore sizes by a variety of techniques. In one embodiment, the first and second film layers having differing maximum pore sizes are formed of different polymer compositions which, upon stretching, provide different maximum pore sizes in the respective films. For example, when the first and second film layers are formed of first and second polymer compositions, respectively, the polymer compositions can be selected such that one of the compositions provides a film layer having a smaller or larger maximum pore size as compared with the other composition(s).

While suitable polymer compositions for use in microporous film layers of the multilayer films according to the present invention are discussed in further detail below, polymers which are suitable for use in providing microporous film layers having relatively smaller maximum pore sizes include, but are not limited to, polypropylene homopolymers and copolymers, nylon polyamides, and the like, while polymers suitable for use in film layers having relatively larger maximum pore sizes include, but are not limited to, ultra low density polyethylene (ULDPE), low density polyethylene (LDPE), linear low density polyethylene (LLDPE), medium density polyethylene (MDPE), and high density polyethylene (HDPE). Additional combinations of polymers for use as the first and second film layers of the multilayer films will be apparent to those of ordinary skill in the art, depending on relative pore sizes of selected polymers. While not wishing to be bound by theory, it is believed that a polymer's modulus (the slope of its stress-strain curve) and/or natural draw may influence the pore size thereof. It is also believed that the number of pores in a layer may be varied by polymer composition.

In a more specific embodiment, wherein the multilayer microporous film comprises three microporous film layers as set forth in FIG. 2, the second film layer is positioned between the first and third film layers and is formed of a second polymer composition which is different from the first and third polymer compositions from which the first and third layers are formed, respectively. In one embodiment, the second polymer composition is selected such that the second film layer has a larger maximum pore size as compared with the maximum pore size of the first and third layers. In an alternate embodiment, the second polymer composition is selected such that the second film layer has a smaller maximum pore size as compared with the first and third film layers. In yet further embodiments, the first and third layers have substantially the same or the same maximum pore sizes.

In further embodiments, the first polymer composition may comprise polypropylene or high density polyethylene, while the second polymer composition may comprise ultra low, low, linear low or medium density polyethylene. In further embodiments, the first polymer composition may comprise polypropylene, while the second polymer composition may comprise ultra low, low, linear low, medium or high density polyethylene. In yet further embodiments, the first polymer composition may comprise ultra low, low, linear low or medium density polyethylene and the second polymer composition may comprise polypropylene or high density polyethylene, or, alternatively, the first polymer composition may comprise ultra low, low, linear low, medium or high density polyethylene and the second polymer composition may comprise polypropylene.

More specifically, in one embodiment of the multilayer microporous film, a first composition of (a) from about 35% to about 45% by weight of linear medium density polyethylene, (b) from about 3% to about 10% by weight of low density polyethylene, (c) from about 40% to about 55% by weight calcium carbonate filler particles, and (d) from about 1% to about 6% by weight of one or more components from a group consisting of the following: pigments, opacifiers, processing aids, antioxidants, stabilizers (light, UV, heat, etc.), tackifiers, and polymeric modifiers is prepared, and a second composition of (a) from about 35% to about 50% by weight of polypropylene homopolymer, (b) from about 2% to about 15% of one or more of low density polyethylene and polypropylene copolymers, (c) from about 40% to about 60% by weight of calcium carbonate particles, and (d) from about 0.1% to about 10% by weight of one or more components from a group consisting of the following: surfactants, pigments, opacifiers, processing aids, antioxidants, stabilizers (light, UV, heat, etc.) and polymeric modifiers is prepared. The first and second compositions are individually melt blended in conventional extrusion apparatus and are then passed through an extrusion combining block such that a three layer structure is produced with one layer of the second composition between two layers of the first composition. The layers are coextruded either into a nip of rollers, onto a chill cast roll, or into a blown film tube, to form a solid film at a speed on the order of about 250 fpm to about 1200 fpm without draw resonance, and an incremental stretching force is applied to the multilayer film in a substantially uniform manner across the film and throughout its depth to provide a multilayer microporous film.

The multilayer film of this embodiment facilitates high speed production as the polyethylene outer layers exhibit improved melt stability as compared with the polypropylene core layer and surprisingly allow production of an extrusion laminated multilayer film at higher speeds as compared with extrusion of a polypropylene film alone.

Another specific embodiment of the multilayer microporous film may be obtained by providing a first composition of (a) from about 35% to about 45% by weight of linear medium density polyethylene, (b) from about 3% to about 10% by weight of low density polyethylene, (c) from about 40% to about 55% by weight calcium carbonate filler particles, and (d) from about 1% to about 6% by weight of one or more components from a group consisting of the following: pigments, opacifiers, processing aids, antioxidants, stabilizers (light, UV, heat, etc.), tackifiers, and polymeric modifiers; and providing a second composition of (a) about 35% to about 50% by weight of high density polyethylene, (b) from about 3% to about 10% of low density polyethylene, (c) from about 40% to about 60% by weight of calcium carbonate particles, and (d) about 0.1% to about 10% by weight of one or more components from a group consisting of the following: surfactants, pigments, opacifiers, processing aids, antioxidants, stabilizers (light, UV, heat, etc.) and polymeric modifiers. The first and second compositions are individually melt blended in conventional extrusion apparatus and are then passed through an extrusion combining block such that a three layer structure is produced with one layer of the second composition between two layers of the first composition. The film is extruded and stretched as described above.

In another embodiment, the first and second film layers are provided with different maximum pore sizes by employing different fillers in the respective layers. The fillers may differ by composition, size, shape, surface coating, and/or any other property which will vary the pore size of the resulting stretched microporous film layer. For example, the first film layer may comprise a first filler having a first average particle size, while the second film layer comprises a second filler having a second average particle size different from the first average particle size. The first and second fillers may have the same or different chemical composition and the first and second film layers may have the same or different polymer compositions. Without intending to be bound by theory, a film layer having a smaller average particle size filler will, with all other variables constant, provide a microporous film layer having a smaller maximum pore size while a larger average particle size filler will, with all other variables constant, provide a microporous film layer having larger maximum pore sizes.

In a more specific embodiment, the microporous film layers of the multilayer microporous film are formed of the same polymer composition and comprise filler of the same chemical composition, with the average particle size of the filler being varied in at least two adjacent layers. In a more specific embodiment, the filler employed in the respective film layers comprises calcium carbonate. Calcium carbonate is typically available in average particle sizes ranging from about 0.1 micron to about 2.5 microns. Calcium carbonate in the lower average particle size ranges is typically formed by precipitation while calcium carbonate in the higher average particle size ranges is typically formed by grinding. In a further embodiment of the three layer multilayer microporous film as described in FIG. 3, the second film layer comprises a second filler having an average particle size smaller than the average particle sizes of the first and third fillers employed in the first and third film layers, and the second film layer is arranged between the first and third film layers whereby the second film layer has a smaller maximum pore size as compared with the first and third film layers. In an alternate embodiment, the second film layer comprises a second filler having a larger average particle size as compared with the first and third fillers employed in the first and third film layers, respectively, and the second layer is arranged between the first and third film layers, whereby the second film layer has a larger maximum pore size as compared with the first and third layers.

Suitable fillers for use in the respective film layers include, but are not limited to, various inorganic and organic materials, including, but not limited to, metal oxides, metal hydroxides, metal carbonates, organic polymers, derivatives thereof, and the like. Preferred fillers include, but are not limited to, calcium carbonate, diatomaceous earth, titanium dioxide, and mixtures thereof. Thus, the composition of the filler may be varied from film layer to adjacent film layer in order to provide different maximum pore sizes to the respective layers after stretching. One typical film layer composition for this embodiment comprises a combination of (a) from about 35% to about 45% by weight of linear low density polyethylene, (b) from about 3% to about 10% by weight of low density polyethylene, (c) from about 40% to about 55% by weight calcium carbonate filler particles, and (d) from about 1% to about 6% by weight of one or more components of a group consisting of the following: pigments, processing aids, antioxidants and polymeric modifiers, with the average particle size of the calcium carbonate filler particles being varied from layer to layer.

Alternately, the shape of the filler, i.e., plates, rods, spears, flakes, spheres, chunks, bricks, may be varied from film layer to adjacent film layer in order to vary the pore size of the respective film layers. In view of the present disclosure, one skilled in the art will be able to easily determine appropriate combinations of various fillers for providing adjacent film layers of varying maximum pore size.

Similarly, the fillers of the respective film layers can be provided with different surface coatings or differing amounts of surface coatings in order to vary the pore size of the respective microporous film layers. Suitable filler coatings are known in the art and include, but are not limited to, silicone glycol copolymers, ethylene glycol oligomers, acrylic acid, hydrogen-bonded complexes, carboxylated alcohols, ethoxylates, various ethoxylated alcohols, ethoxylated alkyl phenols, ethoxylated fatty esters, carboxylic acids or salts thereof, for example, stearic acid or behenic acid, esters, fluorinated coatings, or the like, as well as combinations thereof.

Further, the amount of filler which is employed in the respective film layers may be varied in order to vary the pore size of the respective layers. For example, for a given constant permeability rate, higher concentrations of filler will, with most other variables constant, provide smaller maximum pore sizes, as the film is stretched less. Conversely, for a given constant permeability rate, a lower concentration of particles will provide a microporous film having a larger maximum pore size, as the film must be stretched more to achieve the target permeability rate. One skilled in the art will, in view of the present disclosure, be able to determine suitable variations in the amount of filler employed in respective layers.

The above embodiments allow the variation in pore size between adjacent microporous film layers to be obtained in coextruded films, in extrusion coated films, or in films which are individually extruded and subsequently laminated. However, additional techniques may be employed for varying the pore size of microporous thin films which are not coextruded, but which are formed by extrusion coating a second film layer on a stretched first film layer, or which are laminated together to form a multilayer microporous film subsequent to extrusion and stretching. For example, variations in the stretching temperature, rate, method and/or gear configuration can provide microporous film layers of identical composition with different maximum pore sizes. Without being limited by theory, it is believed that the stretching process variables will effect various properties, for example, the modulus and/or the natural draw, of a film layer polymer composition and thereby effect the maximum pore size resulting from the stretching process. Thus, stretching at higher temperatures may reduce the modulus and/or the natural draw and therefore alter the maximum pore size.

The individual microporous film layers employed in the multilayer films of the invention may be of any suitable thickness which provides desired properties, particularly breathability. Suitably, the microporous film layers will individually have a thickness of from about 0.1 mil to about 10 mils, more specifically from about 0.25 mil to about 5 mils. Additionally, the pores are of a size sufficiently small as to not be readily visible to the naked eye. Preferably, the pores are sufficiently small as to render the multilayer microporous film liquid impervious at atmospheric pressure conditions. In one embodiment, the multilayer microporous films have a maximum pore size in the range of about 0.01 to about 0.25 micron. In another embodiment, the multilayer microporous films exhibit a maximum pore size sufficiently small for the films to act as viral barriers, i.e., not greater than about 0.10 to about 0.12 micron. One skilled in the art will recognize of course that other factors, including, but not limited to, pore count and configuration and film layer thicknesses, will effect these properties. Advantageously, the multilayer microporous films will also exhibit good air and water vapor transmission. Typically, the films will exhibit a moisture vapor transmission rate (MVTR) of greater than about 500 $g/m^2/day$. In more specific embodiments, the microporous multilayer films will exhibit MVTRs of greater than about 1500 $g/m^2/day$, greater than about 2500 $g/m^2/day$, greater than about 3000 $g/m^2/day$, or greater than about 4000 $g/m^2/day$, as measured according to ASTM E96E.

The polymers from which the microporous film layers may be formed comprise thermoplastic polymers that are processable into a film and stretchable to form micropores therein. Suitable polymers for the films include, but are not limited to, polyolefins, for example, polyethylene homopolymers and copolymers, and polypropylene homopolymers and copolymers, functionalized polyolefins, poly(styrene-butadiene-styrene), poly(styrene-isoprene-styrene), poly(styrene-ethylene-butylene-styrene), polyesters, poly(ester-ether), polyamides, including nylons, poly(ether-amide), polyether sulfones, fluoropolymers, polyurethane and the like. Polyethylene homopolymers include those of low, medium or high density and/or those formed by high pressure or low pressure polymerization. Polyethylene and polypropylene copolymers include, but are not limited to, copolymers with C4-C8 alpha-olefin monomers, including 1-octene, 1-butene, 1-hexene and 4-methyl pentene. The polyethylene may be substantially linear or branched, and may be formed by various processes known in the art using catalysts such as Ziegler-Natta catalysts, metallocene catalysts or others widely known in the art. Examples of suitable copolymers include, but are not limited to, copolymers such as poly(ethylene-butene), poly(ethylene-hexene), poly(ethylene-octene), and poly(ethylene-propylene), poly(ethylene-vinylacetate), poly(ethylene-methylacrylate), poly(ethylene-acrylic acid), poly(ethylene-butylacrylate), poly(ethylene-propylenediene), and ethylene-propylene rubber, and/or polyolefin terpolymers thereof. Additionally, thermoplastic polymers suitable for use herein include those which may be biodegradable or environmentally degradable. A number of biodegradable thermoplastic polymers suitable in the practice of the invention are of the normally-solid oxyalkanoyl polymers or dialkanoyl polymers represented by poly(caprolactone) or poly(ethylene adipate); polysaccharides or modified polysaccharides such as starch-resin compositions that may be film-formed.

Suitable nonwoven fibrous layers or webs may comprise, but are not limited to, fibers of polyethylene, polypropylene, polyesters, rayon, cellulose, nylon, and blends of such fibers. A number of definitions have been proposed for nonwoven fibrous webs. The fibers are usually staple fibers or continuous filaments. As used herein "nonwoven fibrous web" is used in its generic sense to define a generally planar structure that is relatively flat, flexible and porous, and is composed of staple fibers or continuous filaments. Typically, such webs are spun bonded, carded, wet laid, air laid or melt blown. For a detailed description of nonwovens, see "Nonwoven Fabric Primer and Reference Sampler" by E. A. Vaughn, Association of the Nonwoven Fabrics Industry, 3d Edition (1992). Such nonwoven fibrous webs typically have a weight of about 5 grams per square meter to 75 grams per square meter, more specifically about 10 to about 40 grams per square meter, and may be included in the films of the invention by extrusion lamination, adhesive lamination or other lamination techniques known in the art.

The multilayer microporous films may be produced according to various methods. In one embodiment, at least two film layers are coextruded and stretched to render them microporous, wherein the first film layer has at least one component which differs from that of the second film layer, which component is adapted to cause the one film to have a maximum pore size upon stretching which is different from that of the second film layer upon stretching. In this embodiment, the film layers may be combined with one or more layer materials, for example, a nonwoven fiber layer, before or after stretching. Alternatively, the microporous film layers may be formed individually, after which the film layers are laminated together and stretched. One skilled in the art will appreciate that the individual layers may be stretched either before lamination or after lamination with each other or with one or more layer materials, for example, a nonwoven fiber layer.

A number of different stretchers and techniques may be employed to stretch the microporous-formable film layers. For example, the film layers may be stretched by cross direction (CD) intermeshing, and/or machine direction (MD) intermeshing. In addition, CD intermeshing, and/or MD intermeshing, may be employed with machine direction orientation (MDO) stretching and/or CD tentering stretchers, in any desired order. Thus, in one embodiment CD intermesh stretching and/or MD intermesh stretching is performed first and followed by MDO stretching. In an alternate embodiment, MDO stretching is performed first and followed by CD intermesh stretching, and/or MD intermesh stretching. Additional variations thereof may also be used. While various specific techniques for these and other stretching techniques are known in the art and may be employed, the following descriptions for suitable stretching techniques and equipment suitable for use herein are described.

Cross Direction (CD) Intermeshing Stretching:

A CD intermeshing stretcher typically comprises of a pair of left hand and right hand helical gear-like elements on parallel shafts. The shafts are disposed between two machine side plates, the lower shaft being located in fixed bearings and the upper shaft being located in bearings in vertically slidable members. The slidable members are adjustable in the vertical direction by wedge shaped elements operable by adjusting screws. Screwing the wedges out or in will move the vertically slidable member respectively down or up to further engage or disengage the gear-like teeth of the upper intermeshing roll with the lower intermeshing roll. Micrometers mounted to the side frames are operable to indicate the depth of engagement of the teeth of the intermeshing roll. Air cylinders are typically employed to hold the slidable members in their lower engaged position firmly against the adjusting wedges to oppose the upward force exerted by the material being stretched. These cylinders may also be retracted to disengage the upper and lower intermeshing rolls from each other for purposes of threading material through the intermeshing equipment or in conjunction with a safety circuit which would open all the machine nip points when activated.

The CD intermeshing elements are typically machined from solid material but can best be described as an alternating stack of two different diameter disks. In one embodiment, the intermeshing disks are about 6" in diameter, about 0.031" thick, and have a full radius on their edge. The spacer disks separating the intermeshing disks are about 5.5" in diameter and about 0.069" in thickness. Two rolls of this configuration would be able to be intermeshed up to 0.231" leaving 0.019" clearance for material on all sides. This CD intermeshing element configuration would have a 0.100" pitch.

Since the CD intermeshing elements are typically capable of large engagement depths, it is advantageous that the equipment incorporate a means of causing the shafts of the two intermeshing rolls to remain parallel when the top shaft is raising or lowering. This is helpful to assure that the teeth of one intermeshing roll always fall between the teeth of the other intermeshing roll and potentially damaging physical contact between intermeshing teeth is avoided. This parallel motion may be assured by a rack and gear arrangement wherein a stationary gear rack is attached to each side frame in juxtaposition to the vertically slidable members. A shaft traverses the side frames and operates in a bearing in each of the vertically slidable members. A gear resides on each end of this shaft and operates in engagement with the racks to produce the desired parallel motion.

Machine Direction (MD) Intermeshing Stretching:

The MD intermeshing stretching equipment is typically identical to the CD intermeshing stretching equipment except for the design of the intermeshing rolls. The MD intermeshing rolls closely resemble fine pitch spur gears. In one embodiment, the rolls have a 5.933" diameter, 0.100" pitch, 30 diametral pitch, 141/2.degree. pressure angle, and are basically a long addendum, topped gear. A second pass may be taken on these rolls with the gear hob offset 0.010" to provide a narrowed tooth with more clearance. With about 0.090" of engagement, this configuration will have about 0.010" clearance on the sides for material thickness.

The above described CD and MD intermeshing stretchers may be employed to produce incrementally stretched microporous films used in the multilayer films of the invention. The stretching operation is usually employed with at least two coextruded films, optionally including one or more nonmicroporous layer materials such as a nonwoven layer to form a composite material.

Machine Direction Orientation (MDO) Stretching:

Typical MDO stretching equipment can be rather complicated but the principles are very simple. Film or film-containing composites, for example film-fabric composites, are passed between roller assembly nipping stations. At least one roller assembly is required; however, three or more roller assemblies can be used. In one embodiment, at least two roller assemblies are used. In many but not all applications, the rolls are heated to assist in the stretching process. The first roller assembly typically contains at least three rolls. The first roll (R1) is an internally heated roll to warm the film or composite prior to presentation to the nip. The second roll (R2) is coated with a resilient material such as rubber to allow nipping (i.e. physical contact) with a metal third roll (R3) without damage. The second roller assembly is a mirror image of the first with a heated roll (R4), a rubber coated roll (R5) and a metal roll (R6). During operation, both nips are closed. The film is nipped between rolls R2 and R3, and rolls R5 and R6. The film is stretched in the air gap between the metal rolls R3 and R6. A typical air gap dimension is from about 0.005" to about 0.550", more specifically from about 0.005" to about 0.050". For example, rolls R1, R2 and R3 are set to run at a slower speed, for example, 100 meters per minute, and rolls R4, R5 and R6 are set to run at a higher speed, for example, 200 meters per minute. The MDO stretch ratio is defined as the velocity ratio of roll R6 to roll R3. For this example, the MDO stretch ratio is 2:1. The film exits the MDO operation longer and thinner than its initial dimensions. This examples uses two nip stations and is provided merely to show one skilled in the art how to apply the principles of this invention. Further multiple-stage MDO is also known in the art and may be employed.

The above described CD and MD intermeshing and MDO stretchers may be employed to produce the multilayer microporous films or composites of nonwoven fibrous web and multilayer microporous films of this invention. The results of this novel stretching produces composites that have excellent breathability and liquid-barrier properties, yet provide soft, cloth-like textures.

In one embodiment, the multilayer microporous films according to the invention may be embossed to produce a pattern of varying thickness across or along the film. Embossing may be conducted either before or after stretching which renders the films microporous. In a more specific embodiment, embossing of the films is conducted prior to any stretching to render the films microporous. Any of the stretching techniques discussed above may be employed on embossed films according to this embodiment. In a more specific embodiment, a multilayer microporous film is formed by embossing a multilayer film and stretching the embossed film by machine direction orientation, using, for example, a stretch ratio of about 4, of about 3, or of about 2 or less. Any embossing techniques suitable for use with polymer films may be employed. In one embodiment, embossing may be conducted using a square embossing pattern such as Velvaflex® (150 emboss lines per inch, 1.8 mil embossing depth) or Taff-a-flex® (60 emboss lines per inch, 4 mil embossing depth), both of which are registered trademarks of Clopay Plastic Products Company, Inc. of Cincinnati, Ohio.

The following examples demonstrate specific embodiments of the multilayer microporous films according to the invention, In the examples, and throughout the specification, parts and percentages are by weight unless otherwise specified. Additionally, reference to measured maximum pore size herein refers to maximum pore size (MPS) as measured using a capillary flow porometer manufactured by Porous Materials, Inc. of Ithaca, N.Y. This method measures the MPS (in microns) for microporous films and nonwoven composites by displacement of a wetting liquid from the pores of a sample by a non-reacting gas. Celgard 2400, available from Celgard Inc. of Charlotte, N.C., was used as a control and has an MPS value of 0.037 micron in this test. Additionally, reference to measured air permeability refers to air permeability as measured by a procedure wherein the volumetric flow rate of air passing through the sample is measured when a supply of air at 90 psig is presented to one side of a test film. Celgard 2400 was used as a control and has an airflow value of 48 in this test.

Example 1

In this example, multilayer microporous films having three microporous film layers and of structure ABA or BAB are prepared using the following melt blended polymer-filler compositions A and B:

Composition A: 53% calcium carbonate, 41% medium density polyethylene, 4% titanium dioxide, 1% CaO masterbatch, and 1% processing aid.

Composition B: 55% calcium carbonate, 37% homopolymer polypropylene resin, 5% low density polyethylene resin, 3% titanium dioxide masterbatch and 1% CaO masterbatch.

The film layers as described in Table 1 are coextruded using standard cast film equipment and process conditions to form multilayer films having a basis weight of 53-60 grams per square meter (gsm) prior to stretching. The coextruded film layers are subsequently stretched via the CD and MD intermeshing processes. The CD engagement is 0.120" and the MD engagement is 0.040". CD stretching is accomplished by passing the film at 200 fpm over a roll heated to 180° F. immediately before stretching, but the film temperature is not controlled during MD stretching. The maximum pore size and the air flow of each multilayer microporous film are measured and are set forth in Table 1. For comparison purposes, a single layer microporous film of each of compositions A and B is also prepared using similar extrusion and stretching conditions. The maximum pore size and the air flow of these single layer microporous films are also measured and are set forth in Table 1.

TABLE 1

| Core Layer | ABA | | | | BAB | | |
|---|---|---|---|---|---|---|---|
| Sample No. | Basis Weight | MPS (micron) | Airflow | Sample No. | Core Layer Basis Weight | MPS (micron) | Airflow |
| 1A | 40 gsm | 0.112 | 43 | 1E | 40 gsm | 0.157 | >100 |
| 1B | 30 gsm | 0.118 | 62 | 1F | 30 gsm | 0.164 | >100 |
| 1C | 20 gsm | 0.119 | 60 | 1G | 20 gsm | 0.136 | 92 |
| 1D | 10 gsm | 0.127 | 88 | 1H | 10 gsm | 0.135 | 63 |
| Single Layer B | 35 gsm | 0.119 | 44 | Single Layer A | 35 gsm | 0.180 | >100 |

The results set forth in Table 1 demonstrate that while the single layer A exhibits a high air flow, it also has a relatively large maximum pore size, which is undesirable for applications requiring high barrier properties. On the other hand, the single layer B exhibits a smaller maximum pore size suitable for various barrier applications, but this single layer microporous film exhibits relatively low air flow. Samples 1A-1H according to the present invention demonstrate the benefits of the multilayer microporous films of the invention. In samples 1A-1D, the inner layer is formed of a microporous film layer having a smaller maximum pore size as compared with the maximum pore size of the outer layers. Surprisingly, the multilayer microporous film exhibits a maximum pore size characteristic of the inner film layer and, as the inner core layer basis weight is reduced, increased air flow. These samples demonstrate the ability to customize or optimize various properties of the multilayer microporous film. For example, air flow, an indication of breathability, of the multilayer microporous film may be increased without sacrificing barrier properties.

In samples 1E-1H, wherein the layer having the largest maximum pore size is arranged as the inner core layer and the layers having the smaller maximum pore size are arranged as the outer layers, the multilayer microporous film surprisingly exhibits high air flow as compared with the single microporous layer B and, as the basis weight of the inner core layer is decreased, a decreasing maximum pore size.

A comparison of samples 1A-1D with samples 1E-1H shows the unexpected influence of the arrangement of the individual film layers on the overall properties of the multilayer microporous film. Particularly, the inner core layer having no free, unconstrained surfaces, appears to dominate the properties of the multilayer microporous film.

Example 2

This example demonstrates multilayer microporous film composites according to the invention. A 30 gsm three layer "ABA" film is extrusion laminated to a 1.9 ounce per square yard (osy) spun bonded polypropylene (SBPP) nonwoven web layer. Each "A" layer comprises a 7 gsm layer formed from a composition comprising 45% polypropylene, 50% calcium carbonate, and 5% low density polyethylene (LDPE). The core "B" layer is 15 gsm and comprises 53% calcium carbonate, 41% medium density polyethylene, 4% titanium dioxide, 1% CaO masterbatch, and 1% processing aid. The laminate is intermeshed immediately after passing over a metal roll heated to 215° F. at 200 fpm. The CD intermeshing engagement is 0.055". The sample is not MD intermeshed. Airflow is measured as 28.

For comparison purposes, a single layer microporous film composite is prepared by extrusion laminating a 30 gsm layer of the above described "A" composition comprising 45% polypropylene, 50% calcium carbonate, and 5% low density polyethylene (LDPE) to a 1.9 osy spun bonded polypropylene (SBPP) nonwoven web layer. The laminate is intermeshed after passing over a metal roll heated to 215° F. at 200 fpm. The CD intermeshing engagement is 0.055". The sample is not MD intermeshed. Airflow is measured as below 5.

Thus, the multilayer microporous ABA film-nonwoven composite exhibits significantly improved air flow as compared with the single film A-nonwoven composite.

Similar inventive and comparative composites are prepared and subjected to measurement of maximum pore size. The inventive composite exhibits a maximum pore size of 0.09 mm, while the comparative compositive exhibits a maximum pore size of 0.03 mm. Thus, this further comparison shows that to obtain a given maximum pore size (and therefore a given breathability) in the multilayer films of the invention, a smaller amount of intermesh stretching will be required as compared with the comparative films described herein. Smaller amounts of incremental stretching allow increased production speeds and/or quality Example 3

In this example, a multilayer microporous film having three microporous film layers is prepared. The film is of an ABA structure wherein each "A" layer comprises 51% calcium carbonate, 45% linear low density polyethylene, 3% titanium dioxide, and 1% calcium oxide, and the "B" layer comprises 54% calcium carbonate, 37% homopolymer polypropylene resin, 5% low density polyethylene resin, 3% titanium dioxide masterbatch and 1% calcium oxide masterbatch. The multilayer film is extruded at a basis weight of 86 gsm, with each "A" layer weighing 28 gsm and the core weighing 30 gsm. The film is oriented in the machine direction to three times the original length at a line speed of 300 fpm. Airflow of the resulting multilayer microporous film is measured at 42 and the MPS is 0.114 micron. No liquid leakage is detected.

For comparison purposes, a single layer microporous film is prepared from a formulation comprising 45% polyethylene, 51% calcium carbonate, 3% titanium dioxide, and 1% calcium oxide and stretched using the MDO described above. Airflow of the resulting single layer microporous film is measured at 27 and the MPS is 0.129 micron.

The inventive multilayer film and the comparative single layer film are subjected to a liquid leakage test. The test is designed to simulate leakage performance of a breathable napkin film in a feminine hygiene pad, as disclosed in European Patent EP 710 472 B1. The test is qualitative and uses a visual comparison to a standard. Specifically, a breathable film sample to be tested is placed on a sheet of filter paper (Whatman No. 4 filter paper, 110 mm diameter), and an absorbent pad is placed on the breathable film. Using a syringe, 10 ml of solution are added to the pad. The solution comprises 100 ml distilled water, 2 grams urea, 0.9 gram sodium chloride, 0.06 gram calcium chloride, and 0.11 gram hydrated magnesium sulphate. This solution is adjusted with a surfactant (such as ammonium lauryl sulphate) to obtain a surface tension of 29 dyne/cm. After 30 seconds, a clear polypropylene film is applied over the pad, and a 4 kg weight is applied to the polypropylene film. After 15 minutes, the weight is removed. The filter paper is compared to a standard to determine a pass or fail ranking for the breathable film. The multilayer film of the invention receives a pass ranking, as no leakage is detected. The comparative single layer film receives a fail ranking as leakage is detected.

Thus, the multilayer microporous film of the ABA structure exhibits significant improvement in breathability and barrier capabilities as compared with the single layer microporous film.

Additional inventive films as described are prepared while varying the amount of machine direction orientation. Multilayer films of good breathability and exhibiting liquid impermeability are obtained using a stretch ratio as low at about 2:1.

Example 4

Figure 5:
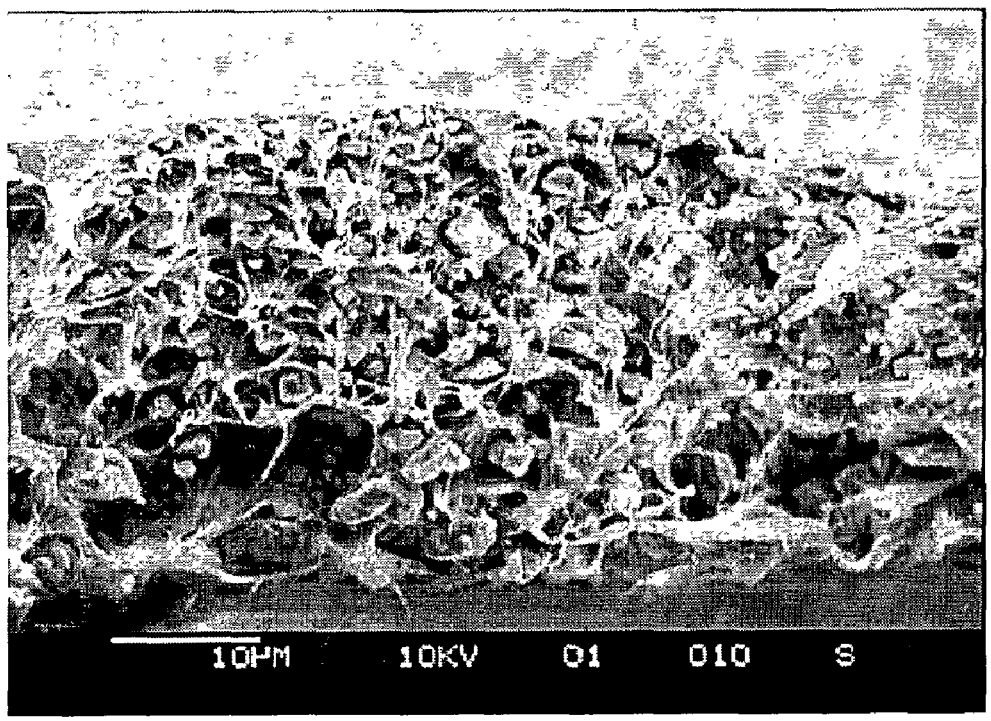
FIG. 5 is an electron photomicrograph showing a multilayer microporous film according to the present invention comprising two microporous film layers as described in Example 4.
Figure 6:
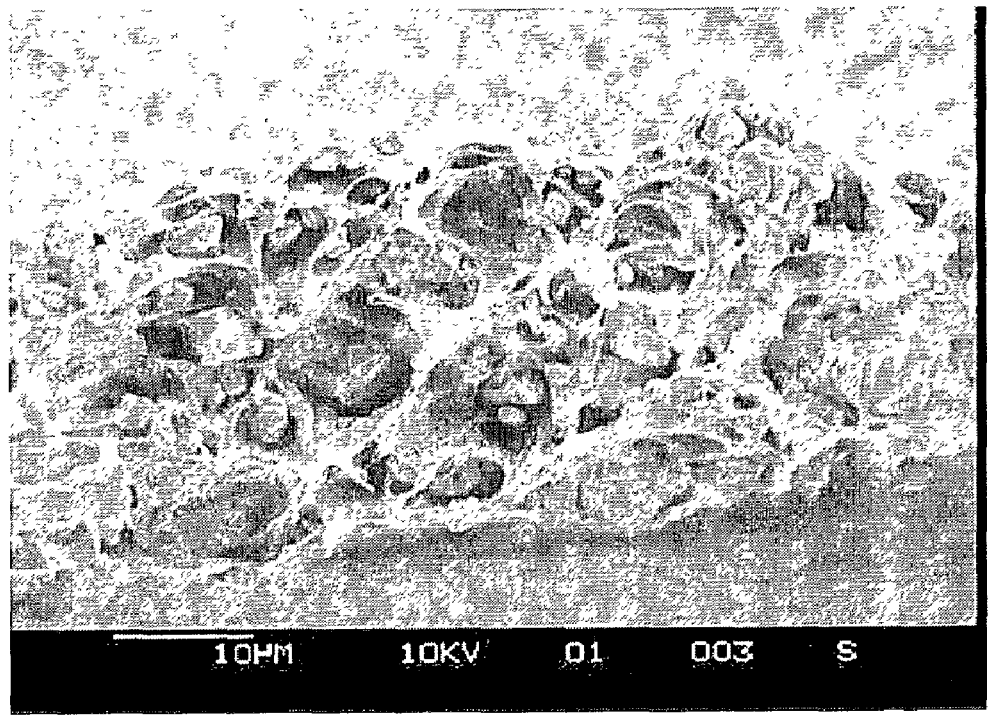
FIG. 6 is an electron photomicrograph showing a conventional one layer microporous film as described in Example 4.

In this example, additional multilayer microporous films according to the invention are prepared. In this example, each film layer comprises 45% calcium carbonate, 50% linear low density polyethylene and 5% of additional components comprising pigments, antioxidants and processing aids. Each calcium carbonate filler is surface coated with approximately 1% stearic acid and the difference in pore size between the various layers is obtained by varying the average particle size of the calcium carbonate from layer to layer. A first multilayer film sample 4A comprises two layers and is therefore of the structure AB. Layer A comprises calcium carbonate having an average particle size of about 1.2 microns while layer B comprises calcium carbonate having an average particle size of about 2.5 microns. An electron photomicrograph (2000×) of the multilayer microporous film of sample 4A is set forth in FIG. 5. For comparison purposes, a single layer microporous film is prepared comprising layer B only. An electron photomicrograph (2000×) of the resulting film is set forth in FIG. 6.

Figure 7:
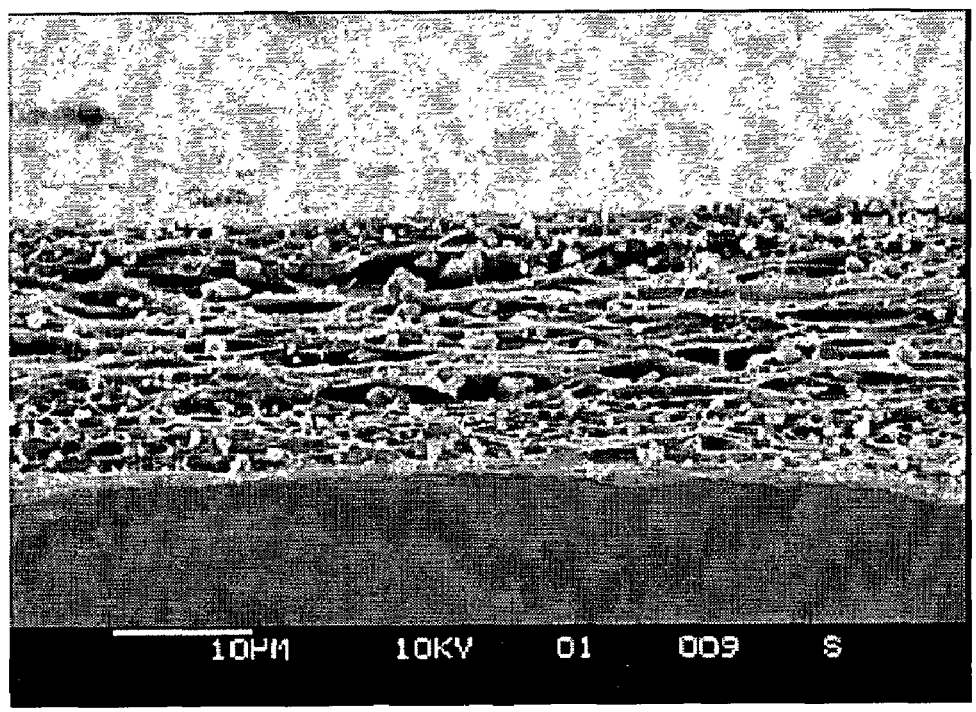
FIG. 7 is an electron photomicrograph showing a multilayer microporous film according to the present invention comprising three microporous film layers as described in Example 4.
Figure 8:
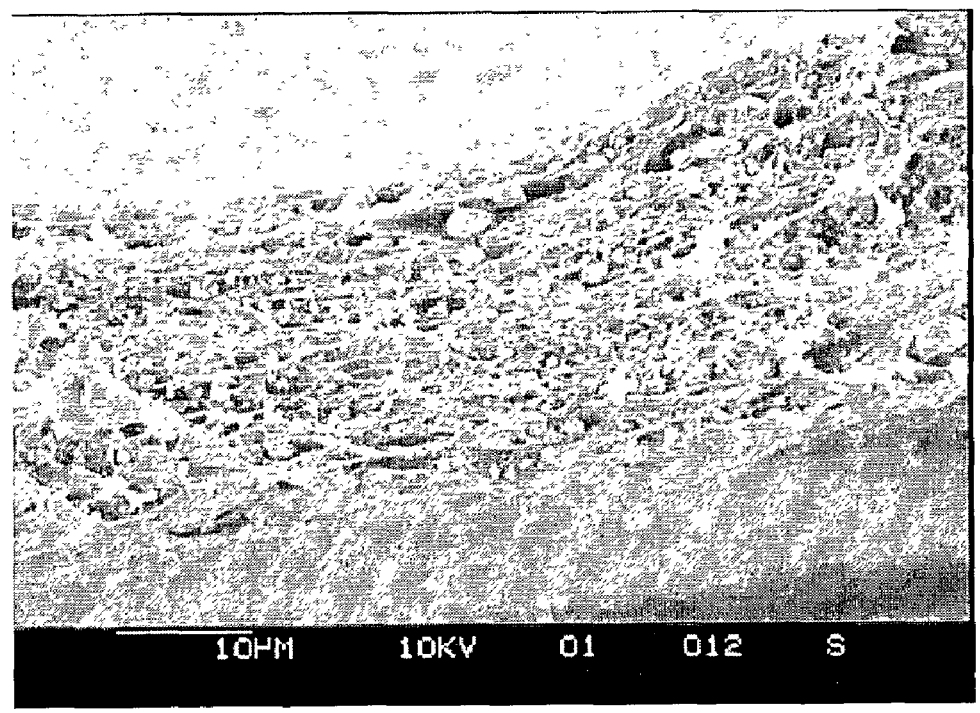
FIG. 8 is an electron photomicrograph showing a multilayer microporous film according to the present invention comprising three microporous film layers as described in Example 4.

Additional multilayer films are prepared comprising three film layers in which the average particle size of the calcium carbonate filler varied from layer to layer. Sample 4B comprises an ABA structure wherein each A layer comprises calcium carbonate having an average particle size of 0.7 micron and the B layer comprises calcium carbonate having an average particle size of 1.2 microns. Sample 4C comprises a multilayer microporous film of the BAB structure wherein each B layer comprises calcium carbonate having an average particle size of 1.2 microns and the A layer comprises calcium carbonate having an average particle size of 0.7 micron. Electron photomicrographs (2000×) of samples 4B and 4C are set forth in FIGS. 7 and 8, respectively.

The Examples and specific embodiments described herein are for illustrative purposes only and are not intended to be limiting of the invention defined by the following claims. Additional embodiments and examples within the scope of the claimed invention will be apparent to one of ordinary skill in the art.

What is claimed is:

1. A breathable, multilayer microporous film, comprising a first outer film layer, a second inner film layer and a third outer film layer, wherein the first, second and third film layers are coextruded, wherein each film layer comprises from about 40% to about 60%, by weight of the respective layer, of at least one pore-forming filler and from about 37% to about 60%, by weight of the respective layer, of thermoplastic polymer, with each film layer rendered microporous and breathable by stretching the film layer having the pore-forming filler therein, wherein the first and third outer film layers have first and third maximum pore sizes, respectively, and the second inner film layer has a second maximum pore size which is the smallest of the first, second and third maximum pore sizes, and wherein the multilayer microporous film is liquid impervious at atmospheric pressure.

2. The multilayer microporous film according to claim 1, wherein each film layer is formed of a polymer composition consisting essentially of one or more polymers selected from the group consisting of polyethylene homopolymers, polypropylene homopolymers, copolymers of ethylene and propylene, copolymers of ethylene and/or propylene with one or more $C_4$-$C_8$ alpha olefin monomers, and mixtures of two or more of said polymers.

3. The multilayer microporous film according to claim 1, wherein the first and third film layers are formed of first and third polymer compositions, respectively, and the second film layer is formed of a second polymer composition different from the first and third polymer compositions.

4. The multilayer microporous film according to claim 3, wherein the first and third polymer compositions comprise polypropylene or high density polyethylene and the second polymer composition comprises ultra low, low, linear low, or medium density polyethylene.

5. The multilayer microporous film according to claim 3, wherein the first and third polymer compositions comprise polypropylene and the second polymer composition comprises ultra low, low, linear low, medium or high density polyethylene.

6. The multilayer microporous film according to claim 3, wherein either the second polymer composition or the first and third polymer compositions comprise polypropylene.

7. The multilayer microporous film according to claim 1, wherein the first and third film layers comprise first and third fillers, respectively, and the second film layer comprises a second filler different from the first and third fillers.

8. The multilayer microporous film according to claim 7, wherein the first and third fillers have first and third average particle sizes, respectively, and the second filler has a second average particle size different from the first and third average particle sizes.

9. The multilayer microporous film according to claim 8, wherein the first film layer, the second film layer and the third film layer comprise the same polymer composition.

10. The multilayer microporous film according to claim 9, wherein the first filler, the second filler and the third filler have the same chemical composition.

11. The multilayer microporous film according to claim 7, wherein the first and third fillers have chemical compositions which differ from the second filler chemical composition.

12. The multilayer microporous film according to claim 7, wherein the first film layer, the second film layer and the third film layer are formed of the same polymer composition.

13. The multilayer microporous film according to claim 1, wherein the first and third film layers comprise first and third amounts of filler, respectively, and the second film layer comprises a second amount of filler different from the first and third amounts.

14. The multilayer microporous film according to claim 1, wherein one of the first and third film layers is laminated to a nonwoven layer.

15. The multilayer microporous film according to claim 1, wherein the multilayer film is stretched by cross direction (CD) and/or machine direction (MD) intermeshing.

16. The multilayer microporous film according to claim 1, wherein the multilayer film is stretched by cross direction (CD) and machine direction (MD) intermeshing only.

17. The multilayer microporous film according to claim 1, wherein the multilayer film is stretched by cross direction (CD) intermeshing and by machine direction orientation (MDO).

18. The multilayer microporous film according to claim 1, wherein the multilayer film is stretched by cross direction (CD) and machine direction (MD) intermeshing and by machine direction orientation (MDO).

19. The multilayer microporous film according to claim 1, wherein the multilayer film is stretched by machine direction orientation (MDO).

20. The multilayer microporous film according to claim 1, wherein the second film layer is formed of a second polymer composition and the first and third film layers are respectively formed of first and third polymer compositions different from the second polymer composition.

21. The multilayer microporous film according to claim 20, wherein the second polymer composition comprises polypropylene and the first and third polymer compositions comprise ultra low, low, linear low, medium or high density polyethylene.

22. The multilayer microporous film according to claim 20, wherein each film layer comprises calcium carbonate pore-forming filler.

23. The multilayer microporous film according to claim 1, wherein the second film layer comprises a second filler and the first and third film layers comprise first and third fillers having average particle sizes larger than the average particle size of the second filler.

24. A breathable, multilayer microporous film, comprising a first outer film layer, a second inner film layer and a third outer film layer, wherein the first, second and third film layers are coextruded, wherein each film layer comprises from about 40% to about 60%, by weight of the respective layer, of at least one pore-forming filler, with each film layer rendered microporous and breathable by stretching the film layer having the pore-forming filler therein, wherein the second film layer has a maximum pore size smaller than the respective maximum pore sizes of the remaining layers of the multilayer film and comprises polypropylene and calcium carbonate, and wherein the multilayer microporous film is liquid impervious at atmospheric pressure.

25. The multilayer microporous film according to claim 24, wherein the first and third film layers comprise ultra low, low, linear low, medium or high density polyethylene and calcium carbonate.

* * * * *